(12) United States Patent
Lieutet

(10) Patent No.: US 9,227,219 B2
(45) Date of Patent: Jan. 5, 2016

(54) DEVICE AND METHOD FOR FORMING A MICROSTRUCTURED COATING ON A SUBSTRATE SUCH AS AN AIRCRAFT ELEMENT

(71) Applicant: Airbus Operations (SAS), Toulouse (FR)

(72) Inventor: Eric Lieutet, Toulouse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 206 days.

(21) Appl. No.: 13/845,456

(22) Filed: Mar. 18, 2013

(65) Prior Publication Data
US 2013/0323425 A1 Dec. 5, 2013

(30) Foreign Application Priority Data
Mar. 23, 2012 (FR) ...................................... 12 52609

(51) Int. Cl.
| | | |
|---|---|---|
| *B05D 1/28* | (2006.01) | |
| *B05D 3/06* | (2006.01) | |
| *B29C 59/04* | (2006.01) | |
| *B05D 1/42* | (2006.01) | |
| B29C 35/08 | (2006.01) | |
| B29C 59/02 | (2006.01) | |

(52) U.S. Cl.
CPC .. *B05D 1/28* (2013.01); *B05D 1/42* (2013.01); *B05D 3/067* (2013.01); *B29C 59/046* (2013.01); *B29C 35/0888* (2013.01); *B29C 2035/0827* (2013.01); *B29C 2059/023* (2013.01); *B64C 2230/26* (2013.01)

(58) Field of Classification Search
CPC ............ B05D 1/28; B05D 1/42; B05D 3/067; B29C 2035/0827; B29C 2059/023; B29C 59/046

USPC .................................. 118/257, 641; 427/256
See application file for complete search history.

(56) References Cited

U.S. PATENT DOCUMENTS

| | | | | |
|---|---|---|---|---|
| 3,747,736 A | * | 7/1973 | Kornylak | ................... 198/371.3 |
| 4,193,959 A | | 3/1980 | Lemelson | |
| 4,438,696 A | * | 3/1984 | George et al. | ................. 101/180 |
| 5,169,571 A | * | 12/1992 | Buckley | ........................ 264/463 |
| 2007/0257400 A1 | * | 11/2007 | Stenzel et al. | ................ 264/293 |
| 2009/0025580 A1 | * | 1/2009 | Sato | .............................. 101/118 |
| 2009/0183643 A1 | * | 7/2009 | Yang et al. | ..................... 101/105 |

FOREIGN PATENT DOCUMENTS

GB 1060044 2/1967

OTHER PUBLICATIONS

French Search Report, Feb. 7, 2013.

* cited by examiner

*Primary Examiner* — Alexander Weddle
(74) *Attorney, Agent, or Firm* — Greer, Burns & Crain, Ltd.

(57) ABSTRACT

A device for forming a microstructured coating on a substrate. The device includes a microstructured band that can be moved by rolling without slipping on the substrate and going around main pressure application elements assembled on a chassis, and secondary pressure application elements assembled on the chassis so as to be in contact with an inner face of the band in a zone of a strand of the band delimited by said main pressure application elements, this zone being exposed to the action of a curing apparatus that accelerates curing of a curable material designed to form said coating. A method for forming a microstructured coating using the above-mentioned device.

10 Claims, 2 Drawing Sheets

DEVICE AND METHOD FOR FORMING A MICROSTRUCTURED COATING ON A SUBSTRATE SUCH AS AN AIRCRAFT ELEMENT

CROSS-REFERENCES TO RELATED APPLICATIONS

This application claims the benefit of the French patent application No. 1252609 filed on Mar. 23, 2012, the entire disclosures of which are incorporated herein by way of reference.

BACKGROUND OF THE INVENTION

This invention relates to the formation of microstructures on substrates, particularly but not exclusively on aircraft wing or fuselage elements in order to obtain a microstructured coating of the type currently referred to as a "riblet" or "shark skin" coating.

STATE OF PRIOR ART

Patent application US 2007/0257400 A1, the entire disclosure of which is incorporated herein by reference, in FIG. 3 discloses a device comprising an endless elastic band assembled on a set of three rolls globally arranged in the form of a triangle and themselves mounted free to rotate about a chassis (not shown). The device also comprises a UV radiation source fixed to the chassis and oriented towards a strand of the device delimited by two of the rolls, hereinafter referred to as the application strand.

This device operates as follows: the outer face of the band is coated with a photocuring resin, and the device is then applied onto the surface of a substrate that is to be covered with a microstructured coating, by applying the two above-mentioned rolls on this surface so as to bring the outer face of the application strand of the band into contact with the substrate, and the device is moved in translation on this substrate so that the band rolls without slipping on this substrate. During this movement of the device, the UV radiation source illuminates at least part of the application strand and causes curing of the resin applied on the substrate by this part of the application strand. After curing, the resin bonds to the substrate and separates from the band when the corresponding part of the band turns around the roll located at the back relative to the direction of translation of the device. As the device moves on the substrate, a coat of cured resin with the required microstructures is obtained on this substrate.

The variants described in FIGS. 1 and 2 of the above-mentioned document comprise only one and two rolls respectively, while the variants described in FIGS. 4 and 5 include an open band.

However, all these devices have the disadvantage that the pressure at which the curable resin is applied onto the substrate is not controlled with sufficient precision and is not sufficiently uniform.

This problem is particularly severe when these devices are used to apply a coating onto a surface facing downwards, in other words when the application pressure of the device on the substrate is oriented in the upwards direction, due to elasticity of the band and the fact that the weight of its lower strand coated with resin then acts in the opposite direction to said application pressure.

SUMMARY OF THE INVENTION

The purpose of the invention is particularly to provide a simple, economic and efficient solution to these problems.

To achieve this, it discloses a device for forming a microstructured coating on a surface of a substrate, comprising:

two main pressure application elements supported on a chassis of the device and at a distance from each other;

a band, one face of which hereinafter referred to as the inner face, is applied onto the main pressure application elements such that these elements delimit a strand of the band between them, hereinafter referred to as the application strand, designed for application of a curable material on the substrate that will form said coating after curing, the other face of the band, referred to as the outer face, having microstructures forming the negative of the microstructures of the coating to be formed, and curing means in the form of an apparatus operative to accelerate curing of the curable material, arranged to act in a predetermined region of said application strand, hereinafter referred to as the curing zone.

The device is configured such that the band moves by rolling without slipping on the substrate and going around the main pressure application elements when the device is moved on this substrate along a longitudinal direction of the application strand of the band by applying this strand on the substrate.

According to the invention, the device comprises secondary pressure application elements assembled on the chassis to be in contact with the inner face of the band in said curing zone of its application strand.

The secondary pressure application elements improve the uniformity and control of the pressure applied by the application strand on the layer of curable material that it deposits on the substrate, while this material is being cured when it is exposed to said curing apparatus.

In a manner known in itself, the band is preferably closed and arranged so as to move around the main pressure application elements like an endless band.

As a variant, this band may be open.

In a manner also known in itself, the main pressure application elements are preferably mounted free to rotate relative to said chassis so as to roll on the band as this band moves along the substrate. These main pressure application elements may for example be composed of rolls for this purpose.

In particular, the arrangement of the band and the main pressure application elements may be similar to that of one of the four devices described in FIGS. 2 to 5 in document US 2007/0257400 A1 mentioned above.

In one preferred embodiment of the invention, the secondary pressure application elements apply load on the application strand along a direction from the inner face towards the outer face of the strand.

The pressure applied by the secondary pressure application elements is thus optimally controlled.

This characteristic also makes it possible to apply satisfactory tension to the band even when the band includes variations of elasticity in time or as a function of the considered regions of this band.

Consequently, the device advantageously comprises elastic elements that urge each secondary pressure application element towards the application strand.

These elastic elements are advantageously composed of springs assembled and fixed to the chassis of the device.

As a variant or additionally, these secondary pressure application elements may be made from an elastic compressible material.

In the preferred embodiment of the invention, the secondary pressure application elements are arranged in a staggered pattern.

Such a configuration allow optimization the uniformity of pressure applied on the application strand by the secondary pressure application elements.

Preferably, each of the secondary pressure application elements closest to each edge of said curing zone has at least one pressure application point on said application strand, for which the distance from the corresponding edge of said curing zone is less than 10%, and preferably less than 5%, of the transverse extent of the band.

In this way, the secondary pressure application elements cover the entire curing zone.

In general, the device advantageously comprises at least one transverse spindle assembled on said chassis carrying a plurality of said secondary pressure application elements distributed along said spindle.

The secondary pressure application elements supported by said transverse spindle are preferably distributed on both sides of the spindle so as to form two transverse rows.

The device preferably also comprises at least two transverse spindles of the type described above.

In the preferred embodiment of the invention, each of the secondary pressure application elements is in the form of a roller assembled free to rotate relative to the chassis so as to roll without slipping when in contact with said band as said band moves on the substrate.

In a manner known in itself, said curing apparatus preferably comprises an ultraviolet radiation source assembled fixed relative to the chassis and configured to emit towards said application strand.

In this case, the secondary pressure application elements and all components for assembling them on the chassis are advantageously made from one or several material(s) at least partially transparent to the radiation emitted by said ultraviolet radiation source.

The transmittance of this or these materials is advantageously more than 25% of said radiation, and preferably more than 50%, or even 75%.

A higher transmittance will result in faster curing of the curable material, and more uniform curing over the entire curing zone.

In the preferred embodiment of the invention, the secondary pressure application elements are distributed in at least four transverse rows configured such that:

the pressure application elements in each row are arranged at regular intervals;

each of the pressure application elements located at the two ends of each row extends as far as the corresponding end of the band;

in each pair of consecutive rows, the pressure application elements of one of said rows are offset transversely relative to the pressure application elements in the other row by a distance equal to approximately half the interval at which the pressure application elements are arranged;

the length of each pressure application element along the longitudinal direction of the band is approximately the same as the components for mounting this element on the corresponding transverse spindle;

in each row, the separation distance between two consecutive assemblies each formed by a pressure application element and by components for mounting the pressure application element on the corresponding transverse spindle, is approximately equal to the transverse length of each of these assemblies.

Furthermore, the separation distance between each secondary pressure application element and the components for assembling this element on the corresponding transverse spindle is preferably selected to prevent any UV radiation emitted by said UV source from being transmitted between the pressure application element and said assembly components.

Thus, all or almost all points in the band are directly exposed to the UV source for the same total duration during displacement of the band. Direct exposure means the situation in which the UV source is not masked by a secondary pressure application element or by the assembly components of this element, for the point considered on the band.

Thus, the uniformity with which the curable material is cured at each point in the curing zone is optimised, regardless of the transmittance of the secondary pressure application elements and their assembly components relative to the radiation emitted by the UV source.

In general, the device also advantageously comprises a device to coat the outer face of the band with the curable material.

As a variant, the band may be coated manually by an operator using the device.

As a variant or additionally, the band may be previously coated with said curable material.

The invention also relates to a method for forming a microstructured coating on a surface of a substrate, such as an aircraft wing or fuselage element, using a device of the type described above, and comprising:

coating the outer face of the band with a material capable of being cured under the effect of the curing apparatus;

applying the main pressure application elements of the device onto the surface of the substrate;

moving the device so as to cause rolling of the outer face of the band on the substrate, and rolling of the pressure application elements on the inner face of the band, the movement taking place at a velocity such that the curable material deposited on the substrate will bond after its exposure to the action of the curing apparatus.

BRIEF DESCRIPTION OF THE DRAWINGS

The invention will be better understood and other details, advantages and characteristics of the invention will become clear after reading the following description given as a non-limitative example with reference to the appended drawings among which.

DETAILED DESCRIPTION OF THE PREFERRED EMBODIMENTS

Figure 1:
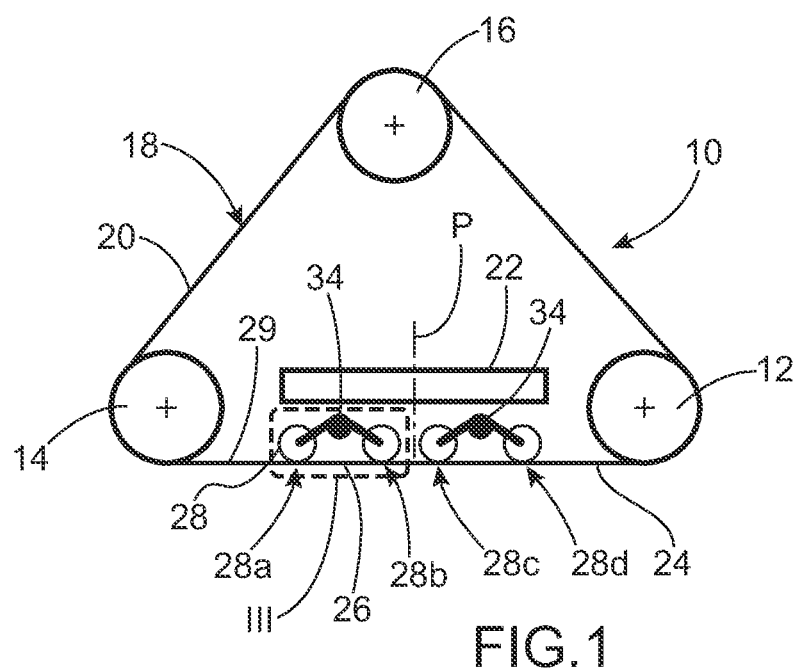
FIG. 1 is a partial diagrammatic side view of a device according to a preferred embodiment of the invention in which the chassis is not shown for reasons of clarity.

FIG. 1 shows a device 10 according to a preferred embodiment of the invention used for applying a microstructured coating on the surface of a substrate.

This device comprises two main pressure application elements 12 and 14 in the form of rolls, and a guide roll 16. These three rolls are arranged in the form of a triangle and are assembled free to rotate on a chassis not shown in FIG. 1.

The device also comprises a closed elastic band 18 brought into contact with the three above-mentioned rolls 12, 14, 16.

These three rolls tension the band 18 and make the band move around them like an endless band.

The band 18 comprises microstructures on its outer face 20 that are preferably formed along the entire length of the band 18.

The band 18 is made from a material with elasticity selected as a function of the required geometric precision for microstructures, in each particular application.

Document US 2007/0257400 A1 mentioned above and incorporated herein by reference contains a detailed example of a method for manufacturing such a band (see sections 80 to 90 in said document).

The device also comprises an ultraviolet radiation source 22 assembled fixed relative to the chassis of the device, so as to emit towards the strand 24 of the band 18 defined between the two main pressure application rolls 12 and 14. This strand 24, referred to as the application strand, will apply a resin on a substrate, that is curable under the effect of radiation emitted by the source 22 so as to form the microstructured coating.

Preferably, the device comprises a device to coat the outer face 20 of the band 18 using this resin, this device not being shown on the figures. This device may for example be designed to take resin from a reservoir fixed to the chassis of the device. The design of such a device is independent of this invention such that this device will not be described in detail in the following. The band 18 may also be coated with the resin manually.

As a variant, the substrate may firstly be coated with a layer of such a resin.

A detailed example of a UV source and suitable photocurable resin may be found in paragraphs 91 to 109 of document US 2007/0257400 A1 mentioned above, and which constitute a known and acceptable curing means for accelerating the curing of a curable resin material forming the coating. Other frequencies in the electromagnetic spectrum and other curable resins may also be employed in carrying out the present invention.

The UV source 22 is generally a rectangular parallelepiped and illuminates a region 26 of the application strand 24 with an approximately rectangular shape, referred to as the curing zone in the terminology used in this invention. This zone is obviously fixed relative to the UV source 22 and therefore relative to the chassis of the device.

According to one special feature of this invention, the device 10 comprises a set of rollers 28 applied on the inner face 29 of the band 18 at the curing zone 26, and forming secondary pressure application elements according to the terminology in this invention. These rollers are distributed in a staggered pattern along four transverse rows 28a, 28b, 28c and 28d. "Transverse" means that these four rows extend orthogonally to the longitudinal direction of the band 18 corresponding to the arrow 30 in FIG. 1.

Figure 2:
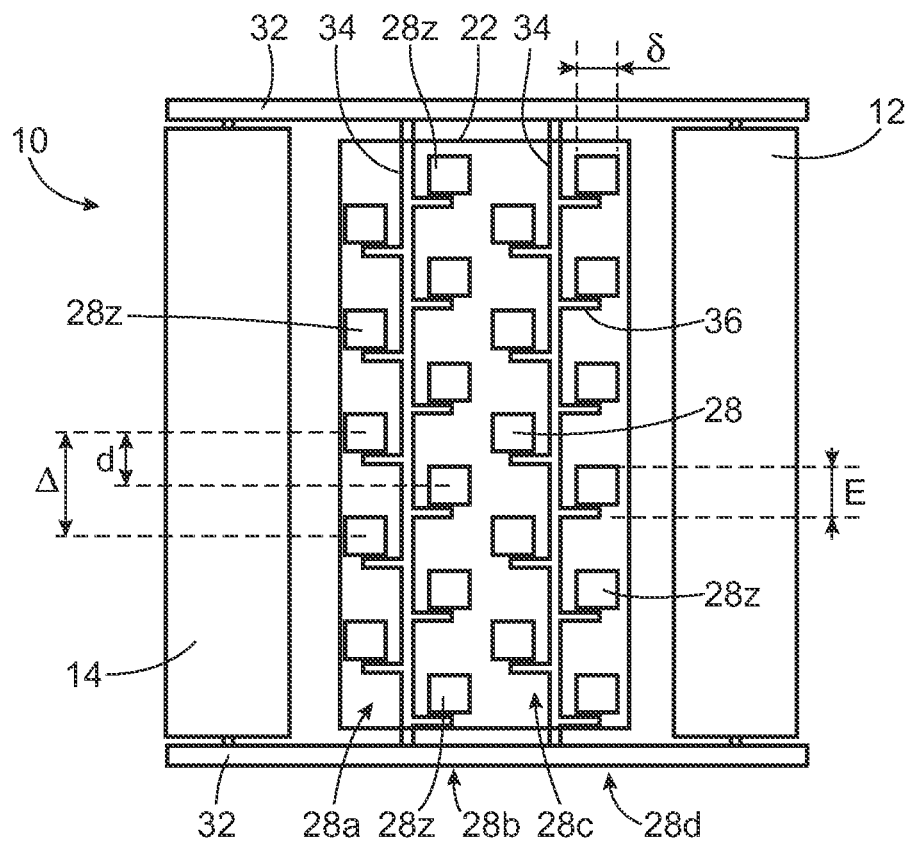
FIG. 2 is a partial diagrammatic bottom view of the device in FIG. 1, in which the band is not shown for reasons of clarity.

FIG. 2 shows the device 10 seen from below without the band 18, such that the rollers 28 and the UV source 22 can be seen. This figure also shows two side plates 32 that form part of the chassis of the device and that support the corresponding rotation spindles of the three rolls 12, 14 and 16. The guide roll 16 is not shown in this FIG. 2 for reasons of clarity.

As shown in FIGS. 1 and 2, the device 10 comprises two transverse spindles 34 assembled fixed on plates 32 and each supporting two of the four rows of rollers 28. These two spindles 34 are arranged at a distance from the main pressure application rolls 12 and 14, symmetrically about a median transverse plane P of the UV source 22 (FIG. 1).

Rollers 28 are arranged to cover the entire curing zone 26 of the application strand 24. To achieve this, the rollers 28z closest to the edges of this zone 26 are arranged to be in contact with parts of the application strand 24 located at a distance from its edges equal to less than 10%, and preferably less than 5%, of the width of the band 18. In this way, the pressure applied to the application strand 24 by the rollers 28 is optimally distributed over the entire curing zone 26.

Figure 3:
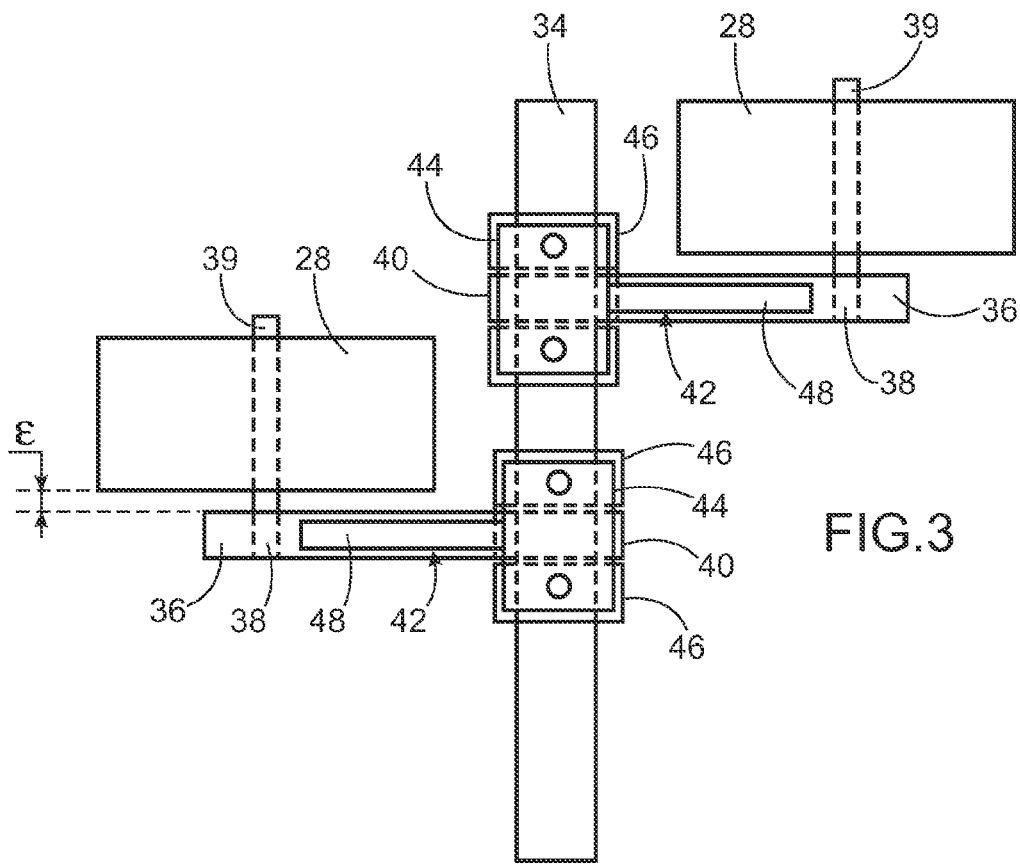
FIG. 3 is a diagrammatic top view of detail III in FIG. 1.
Figure 4:
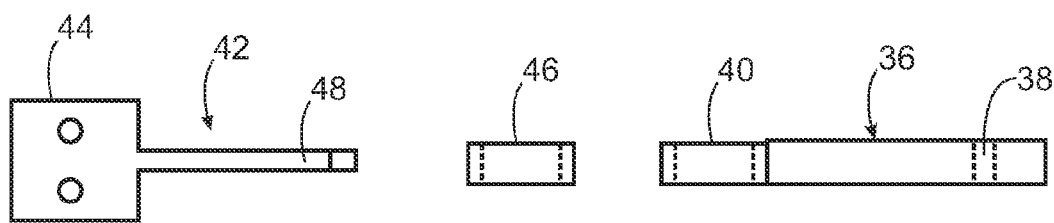
FIG. 4 is an exploded diagrammatic top view of some assembly elements of a roller visible in FIG. 3.
Figure 5:
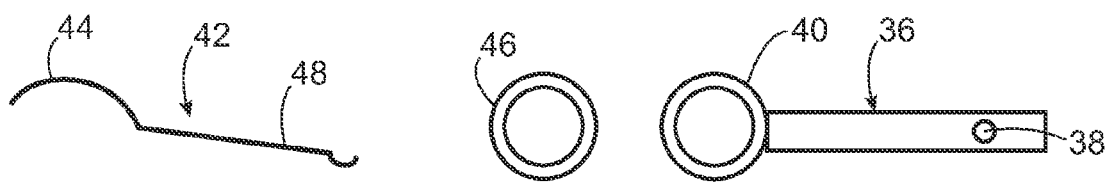
FIG. 5 is an exploded diagrammatic side view of the elements shown in FIG. 4.

FIGS. 3 to 5 contain a more precise illustration of the assembly of each roller 28 on the corresponding transverse spindle 34, essentially by components including a rod 36 forming a shaft comprising an orifice 38 at one of its ends, inside which a rotation spindle 39 of the roller 28 is assembled, and an assembly ring 40 assembled on the transverse spindle 34, at its other end.

A plurality of leaf springs 42 each apply pressure on a corresponding roller 28 towards the application strand 24, to keep the rollers 28 applied on the application strand 24 of the band 18.

This is achieved by providing each spring 42 with a half-cylindrical end part 44 fixed around two rings 46, themselves assembled fixed around the corresponding transverse spindle 34 located on each side of the assembly ring 40 of the rod 36 supporting the associated roller 28. The end part 44 of each leaf spring 42 is thus fixed to the corresponding transverse spindle 34, and is therefore fixed to the chassis of the device.

A leaf-shaped part 48 extends from said end part 44 of each spring 42, bearing on the rod 36 so as to push this rod and therefore the corresponding roller 28, towards the application strand 24.

Although it cannot be seen in FIG. 5, the assembly ring 40 for each rod 36 has an outside diameter less than the diameter of rings 46 arranged on each side of the assembly ring 40 so as to allow this assembly ring 40 and therefore the roller 28 to rotate around the transverse spindle 34.

Obviously, the leaf springs 42 could be replaced by torsion springs, or by any other suitable type of elastic elements without going outside the scope of this invention.

The rollers 28 and their spindles 39, the rods 36, the springs 42, the rings 46 and the transverse spindles 34 are preferably made from one or several material(s) transparent to UV radiation emitted by the UV source 22. In particular, each of these elements preferably has a transmittance of more than 25%, preferably 50%, and even more preferably 75% in a spectral band in which the photocurable resin is sensitive.

Furthermore, as can be seen in FIG. 2, the rollers 28 in each row 28a to 28d are arranged at regular intervals.

For each pair (28a, 28b), (28b, 28c) and (28c, 28d) of consecutive rows, the rollers 28 of one of the rows are transversally offset from the rollers in the other row, by a distance d equal to approximately half the interval Δ at which the rollers are arranged.

Each roller 28 has approximately the same extent δ along the longitudinal direction of the band 18, as the rod 36 used for assembling this roller on its transverse spindle 34.

Furthermore, in each row, the transverse extent E of each assembly composed of a roller 28 and the rod 36 enabling assembly of the roller on its transverse spindle 34, is equal to approximately half the interval Δ at which the rollers are arranged.

Furthermore, each of the rollers 28 that are arranged at the two ends of each row extends as far as the corresponding end of the band.

The distance ε (FIG. 3) between each roller 28 and the rod 36 on which it is assembled, that is deliberately exaggerated in FIG. 3 for reasons of clarity, is actually very small so as to prevent or at least minimise the quantity of UV radiation that might pass between the roller 28 and its rod 36.

Thus, almost all points on the band are exposed to UV radiation from the UV source 22 for practically the same duration. More precisely, as the band 18 moves, points on this band passing under two corresponding rollers 28 of rows 28a and 28c remain concealed from the source 22 by these rollers for approximately the same time period as the points on the band passing under rollers of the two other rows 28b and 28d, and the points on the band passing under rods 36.

The device described above may be used to form a microstructured coating on the outer surface of a substrate, using a method according to which:

the outer face 20 of the band 18 is coated with resin that can be cured under the effect of the UV source 22;

the main pressure application rolls 12 and 14 of the device are brought into contact with the surface of the substrate;

the device is moved in translation along a direction 30 parallel to the longitudinal direction of the band 18, so as to make the outer face 20 of the band 18 coated with resin roll on the substrate, at the same time as each of the three rolls 12, 14 and 16 roll on the inner face 29 of the band 18.

During this movement, the resin present on the band 18 is deposited on the substrate at the roll 12 located at the front.

The deposited resin layer is then trapped between the substrate and the band 18 that forms microstructures in this resin layer with the conjugate shape of the microstructures in the band 18.

Since the device and particularly the UV source 22 continues its movement, the deposited resin enters the curing zone 26 illuminated by the UV source 22. The residence time of the resin in this zone that depends on the displacement velocity of the device, is such that the resin can be at least partly cured and bond to the substrate.

When the resin leaves the curing zone, and as the device continues its movement, the roll 14 arranged at the back passes over this resin and the band 18 goes around this roll, such that the resin bonding to the substrate separates from the band 18.

The device thus leaves behind a band of microstructured coating composed of the layer of cured resin, on the substrate.

As the device moves, the application strand 24 is continuously pressed by the rollers 28 and consequently applies the resin on the substrate with a uniform and controlled pressure that depends on the mechanical properties of the springs 42 and rollers 28.

The quality of the coating obtained is thus optimum.

Furthermore, the device can be used without difficulty if the main pressure application rolls 12 and 14 and the application strand 24 face upwards to form a microstructured coating on the lower face of a substrate.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A device for forming a microstructured coating on a surface of a substrate, comprising:
    a chassis;
    two main pressure application elements supported on the chassis and at a distance from each other;
    a band, one face of which, hereinafter referred to as the inner face, is applied onto said main pressure application elements such that these elements delimit a strand of the band between them, hereinafter referred to as the application strand, designed for application of a curable material on the substrate that will form said coating after curing, the other face of the band, referred to as the outer face, having microstructures forming the negative of the microstructures of the coating to be formed;
    a curing apparatus operable to accelerate curing of the curable material, arranged to act in a predetermined region of said application strand, hereinafter referred to as the curing zone; and,
    a plurality of secondary pressure application elements in contact with said inner face of the band in said curing zone of its application strand, wherein the secondary pressure application elements are arranged on at least one spindle of the chassis and wherein said secondary pressure application elements are biased by elastic elements towards the application strand and, wherein the secondary pressure application elements are arranged on the at least one spindle by a rotation spindle connected to the at least one spindle by a rod having a ring disposed about the at least one spindle.

2. The device of claim 1, wherein the secondary pressure application elements are arranged on at least two spindles of the chassis.

3. The device according to claim 1, in which said secondary pressure application elements are biased towards said application strand in a direction from the inner face towards the outer face of the strand.

4. The device according to claim 1, in which said secondary pressure application elements comprise a plurality of rollers arranged in staggered transverse rows.

5. The device according to claim 4, in which said secondary pressure application elements are arranged such that the secondary pressure application elements closest to each edge of said curing zone have at least one pressure application point on said application strand the at a distance from the corresponding edge of said curing zone that is less than 10% of the transverse extent of the band.

6. The device according to claim 4, in which said secondary pressure application elements are arranged such that the secondary pressure application elements closest to each edge of said curing zone have at least one pressure application point on said application strand at a distance from the corresponding edge of said curing zone that is less than 5% of the transverse extent of the band.

7. The device according to claim 1, wherein secondary pressure application elements are distributed along the at least one spindle, on both sides of the spindle.

8. The device according to claim 1, in which each of said secondary pressure application elements is in the form of a roller assembled free to rotate relative to said chassis so as to roll without slipping when in contact with said band as said band moves on the substrate.

9. The device according to claim 1, in which said curing apparatus comprises an ultraviolet radiation source assembled fixed relative to said chassis and configured to emit towards said application strand.

10. The device according to claim 9, in which said secondary pressure application elements are assembled on said chassis with several components and said secondary pressure application elements and said components, are made from one or several material(s) at least partially transparent to the radiation emitted by said ultraviolet radiation source.

* * * * *